(12) United States Patent
Ijzerman et al.

(10) Patent No.: US 7,824,091 B2
(45) Date of Patent: Nov. 2, 2010

(54) BACKLIGHT ARRANGEMENT

(75) Inventors: Willem Lubertus Ijzerman, Eindhoven (NL); Michel Cornelis Josephus Marie Vissenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 213 days.

(21) Appl. No.: 12/097,784

(22) PCT Filed: Dec. 5, 2006

(86) PCT No.: PCT/IB2006/054597

§ 371 (c)(1),
(2), (4) Date: Jun. 17, 2008

(87) PCT Pub. No.: WO2007/072263

PCT Pub. Date: Jun. 28, 2007

(65) Prior Publication Data

US 2008/0259643 A1    Oct. 23, 2008

(30) Foreign Application Priority Data

Dec. 21, 2005  (EP) .................................. 05112558

(51) Int. Cl.
*F21V 7/04* (2006.01)
(52) U.S. Cl. ...................... 362/616; 362/619
(58) Field of Classification Search .............. 362/31, 362/616, 619
See application file for complete search history.

(56) References Cited

U.S. PATENT DOCUMENTS 6,379,016 B1    4/2002  Boyd et al.

2004/0125592 A1*  7/2004  Nagakubo et al. ............. 362/31
2007/0147088 A1*  6/2007  Chien et al. ................. 362/616

FOREIGN PATENT DOCUMENTS

| DE | 10005554 A1 | 8/2001 |
|----|-------------|--------|
| EP | 0879991 A2 | 11/1998 |
| EP | 1134488 A1 | 9/2001 |
| GB | 2406731 A | 4/2005 |
| JP | 11273438 A | 10/1999 |
| JP | 2000106021 A | 4/2000 |
| JP | 2001066547 A | 3/2001 |
| WO | 9839598 A1 | 9/1998 |
| WO | 2005031444 A2 | 4/2005 |

* cited by examiner

*Primary Examiner*—David V Bruce
(74) *Attorney, Agent, or Firm*—Larry Liberchuk

(57) ABSTRACT

A backlight arrangement (100) comprising at least a light source (101) and a waveguide plate (102) comprising a front surface (104) and an opposing back surface (103) and at least one surface (107) for receiving light from said light source (101), said surface for receiving light connecting said front and back surfaces is provided. At least one of said front surface (104) and said back surface (103) is a facetted surface comprising a plurality of planar parallel portions (105) and a plurality of facets (106) connecting said planar parallel portions. The facets (106) are formed such that the thickness of said waveguide plate (102) decreases stepwise with the distance from said surface (107) for receiving light, and such that at least part of the light received into the waveguide plate (102) via said surface (107) for receiving light is extracted from said waveguide plate (102) through said facets (106).

11 Claims, 5 Drawing Sheets

BACKLIGHT ARRANGEMENT

The present invention relates to a backlight arrangement comprising at least a light source and a waveguide plate comprising a front surface and an opposing back surface and at least one surface for receiving light from said light source, said surface for receiving light connecting said front and back surfaces.

The present invention also relates to display devices comprising a backlight arrangement of the present invention.

In certain display applications, it is desired that the image produced in by the display device is only visible in a certain angular range, whereas the image is not visible from viewing angles outside this range.

For example, in an automotive application of a display, it may be desirable that the displayed image is only visible to the passengers and not to the driver, in order to not distract the driver's attention. One such example is a video entertainment system having a display arranged in the dashboard of a car, where the co-driver could watch a movie or pictures for entertainment, without distracting the driver.

In certain applications, it may further be desirable that different images are visible from different viewing angles. For example in an automotive application, certain information, such as route planning information from a navigational system, should be visible to the driver, whereas the co-driver and passengers may watch a movie or pictures for entertainment, without distracting the driver.

Dual view displays for this purpose are known in the art, for example from WO 2005/031444 to Koninklijke Philips Electronics N.V.

However, care should be taken that a viewer placed between the driver and the co-driver, for example in the middle back seat is not fed with both the information for the driver and the information for the co-driver simultaneously. Thus, it is desirable that no light, i.e. information, is emitted from the display in the direction between the angular range for the driver and the co-driver.

To improve the performance of the dual-view display it is therefore desired that the backlight has a dedicated angular light output in the desired discrete angular ranges and no light output in the direction between theses dedicated ranges.

One backlight for providing light in two directions is described in WO98/39598 to Robert Bosch GMBH, comprising two optical conductor plates arranged on top of each other. The first optical conductor plate extracts light in a first direction, and the second conductor plate extracts light in a second direction.

A prismatic film is arranged on the back surface of each of the conductor plates. Light conducted (waveguided) in such conductor plates is reflected on the prismatic surfaces towards the front surface at a near right angle with regard thereto in order to be extracted out of the conductor plate. By selecting the shape of the prismatic structures, the angles at which light is extracted can be defined.

One drawback of the described in WO 98/39598 is that the angular light distribution inside the waveguide changes due to the prismatic structure. Thus, the angular distribution of the extracted light is not easily determinable as a function of the distribution of the input light. Further, in order to obtain a homogenous extraction of light throughout the conductor plate, a very precise design of a spatially varying prismatic structure is necessary.

Thus, there is a need for a backlight which provides extracted light having an angular distribution directly depending on the angular distribution of the input light. Also there is a need for a backlight which provides a homogenous light extraction throughout the whole waveguide plate, and having an easily obtainable structure.

The backlight should in addition preferably not provide essentially any light in the direction perpendicular to the plane of the backlight.

It is an object of the present invention to overcome these problems, and to provide a backlight arrangement, which may provide light at oblique angles with a defined angular range, but preferably no light at near right angles to the plane of the backlight, which provides light having an angular distribution depending on the angular distribution of the input light, and which is relatively easy to manufacture.

It is a further object to provide such a backlight arrangement, which may provide light at two separate oblique angles with defined angular range, but preferably no light at near right angles to the plane of the backlight.

It is yet a further object of the present invention is to provide a display device providing information at defined range of oblique viewing angles but preferably no light at near right angles to the plane of the backlight It is still yet a further object of the present invention to provide a dual view display device providing information in two separately defined ranges of oblique viewing angles but preferably no light at near right angles to the plane of the backlight.

The present inventors have found that a backlight arrangement comprising at least one waveguide having a surface at which light is extracted through portions of the surface non-parallel to the main extension of the waveguide may be used to achieve these objects.

Thus, in a first aspect the present invention provides a backlight arrangement comprising at least a light source and a waveguide plate comprising a front surface and an opposing back surface and at least one surface for receiving light from said light source, said surface for receiving light connecting said front and back surfaces. In such a waveguide plate at least one of said front surface and back surface is a facetted surface comprising a plurality of planar parallel portions and a plurality of facets connecting said planar parallel portions. The facets are formed such that the thickness of said waveguide plate decreases stepwise with the distance from said surface for receiving light, i.e. decreases for each facet, and such that at least part of the light received into the waveguide plate via said surface for receiving light is extracted from said waveguide plate through said plurality of facets.

Light that is introduced into the waveguide plate and which is subject to internal reflection on the front and back surfaces will be conducted in the waveguide.

However, when such light encounters a facet, the angle of incidence on this facet will be small enough for at least a part of the light such that at this part of the light will be extracted from the waveguide.

The angular range of the light extracted through the facets will depend on the angular range of the light introduced into the waveguide. Thus, the angular range of the extracted light can easily be set by providing light having an appropriate angular range to the surface for receiving light.

Where all the facets are arranged having the same height and angle and are uniformly distributed over the length of the waveguide plate, the light received via the surface for receiving light will be homogenously extracted from the waveguide.

In embodiments of the present invention, the facets may be formed at angles β in the range of from 70° to 110° to the surfaces of said planar parallel portions.

Within this range of angles, the extraction efficiency is high, leading to a high efficient backlight arrangement.

In preferred embodiments of the present invention, the facets are formed essentially perpendicular to the surfaces of the planar parallel portions.

When the facets are formed essentially perpendicular, i.e. when the angle β is about 90°, essentially no light is extracted in the direction perpendicular to the plane of the waveguide plate. Further, the extracted light has essentially the same angular distribution as the waveguided portion of the light provided by the light source.

In embodiments of the present invention, a backlight arrangement comprises at least a first and a second waveguide plate as defined above arranged on top of each other.

Such a backlight arrangement allows light to be extracted in two independent directions.

For example, the surface for receiving light of the first waveguide plate and the surface for receiving light of said second waveguide plate may be arranged parallel to each other but facing in opposite directions.

In embodiments of the present invention, the faceted surface of the first waveguide may face the faceted surface of the second waveguide.

This arrangement is the most efficient arrangement for a backlight comprising two superposed waveguide plates.

In embodiments of the present invention, a first light source is arranged to provide light having a first angular spread to the surface for receiving light of said first waveguide, and a second light source is arranged providing light having a second angular spread to the surface for receiving light of the second waveguide.

The angular distributions of the light extracted from the two separate waveguide plates may be independent from each other. This may for example be advantageous if it is desired that the extracted light in one direction is to be more focused than the extracted light in the other direction.

In embodiments of the present invention, the backlight arrangement has a front side adapted to face a display panel and an opposing back side, wherein a reflective surface may be arranged at the back side of the backlight arrangement.

Under certain circumstances, the light extracted from the waveguide plate through the facets will include at least a certain part, which is directed towards the backside of the arrangement. By arranging a reflective surface on this backside, this light will be redirected to the front side, thus increasing the light utilization efficiency of the backlight arrangement.

In embodiments of the present invention, a refractive element may be arranged at said front side of said backlight arrangement.

Such refractive elements may be used to redirect and/or change the angular distribution of the extracted light, to obtain desired values on direct ion/distribution.

In a second aspect, the present invention provides a display device comprising a backlight arrangement according to the present invention.

Especially, the present invention provides a dual view display device comprising a backlight arrangement of the present invention.

These and other aspects of the present invention will now be described in more detail, with reference to the appended drawings showing a currently preferred embodiment of the invention.

Figures 5A, 5B:
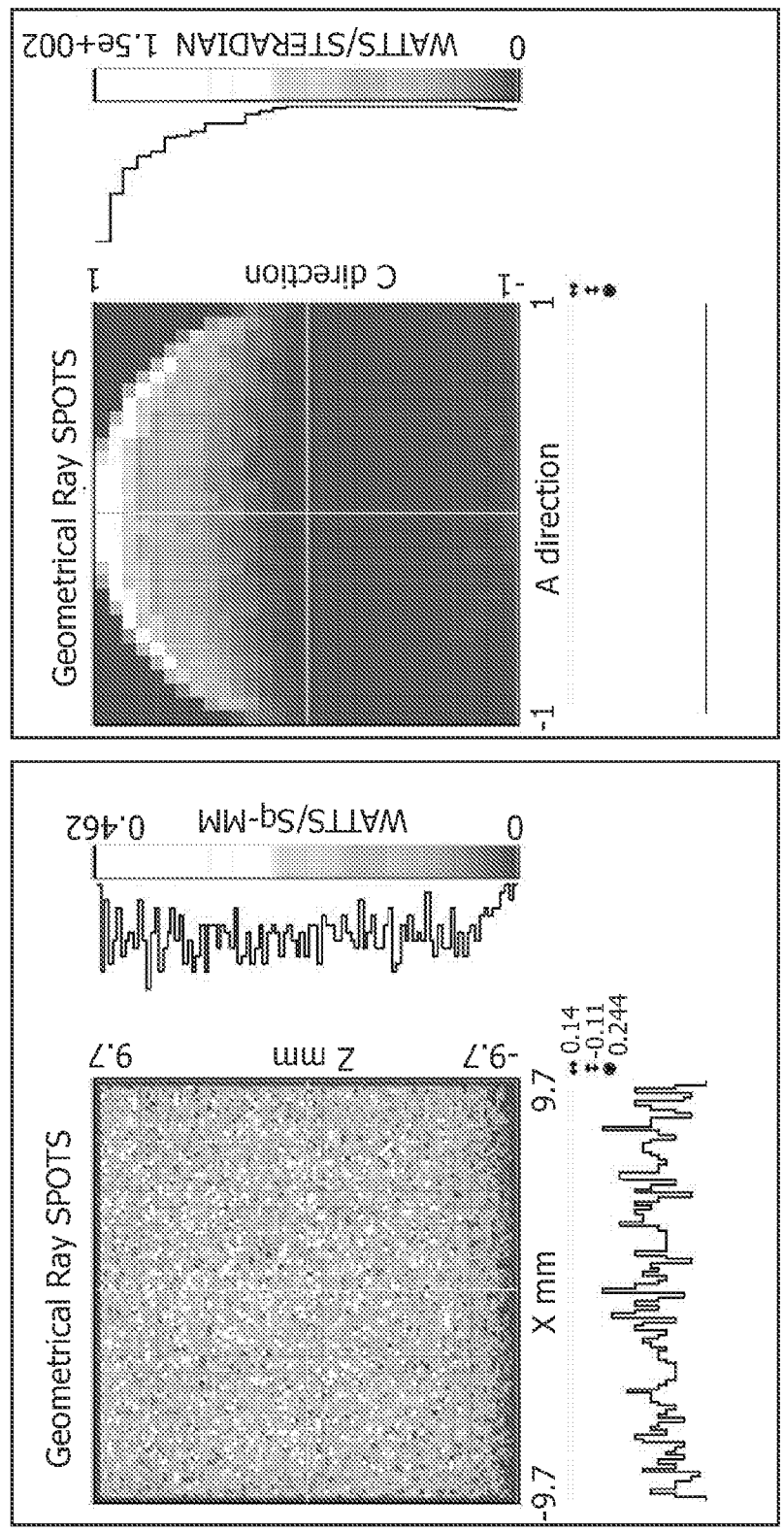
Figure 6B:
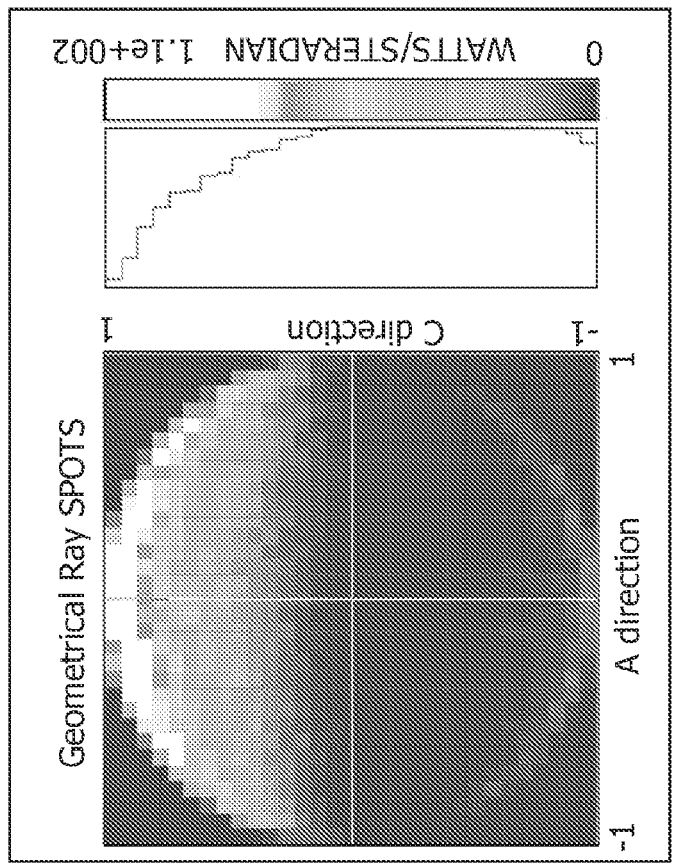
Figure 6A:
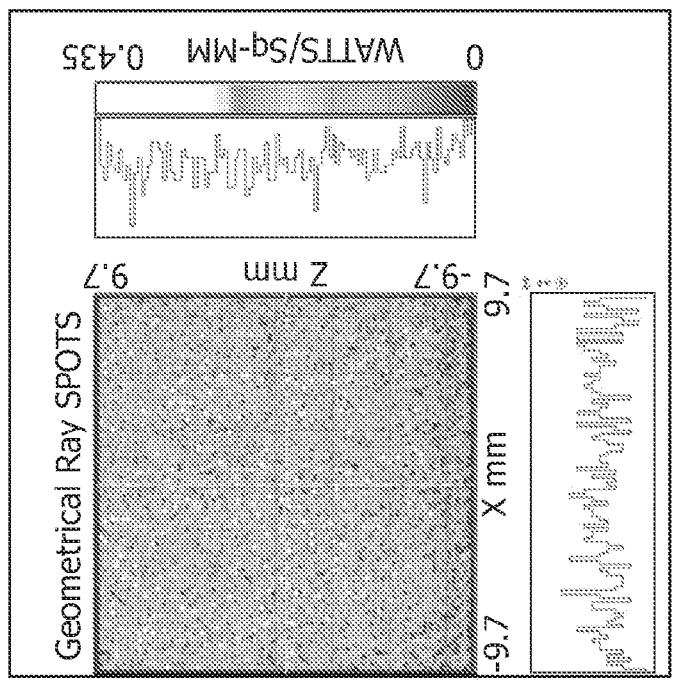
Figures 7A, 7B:
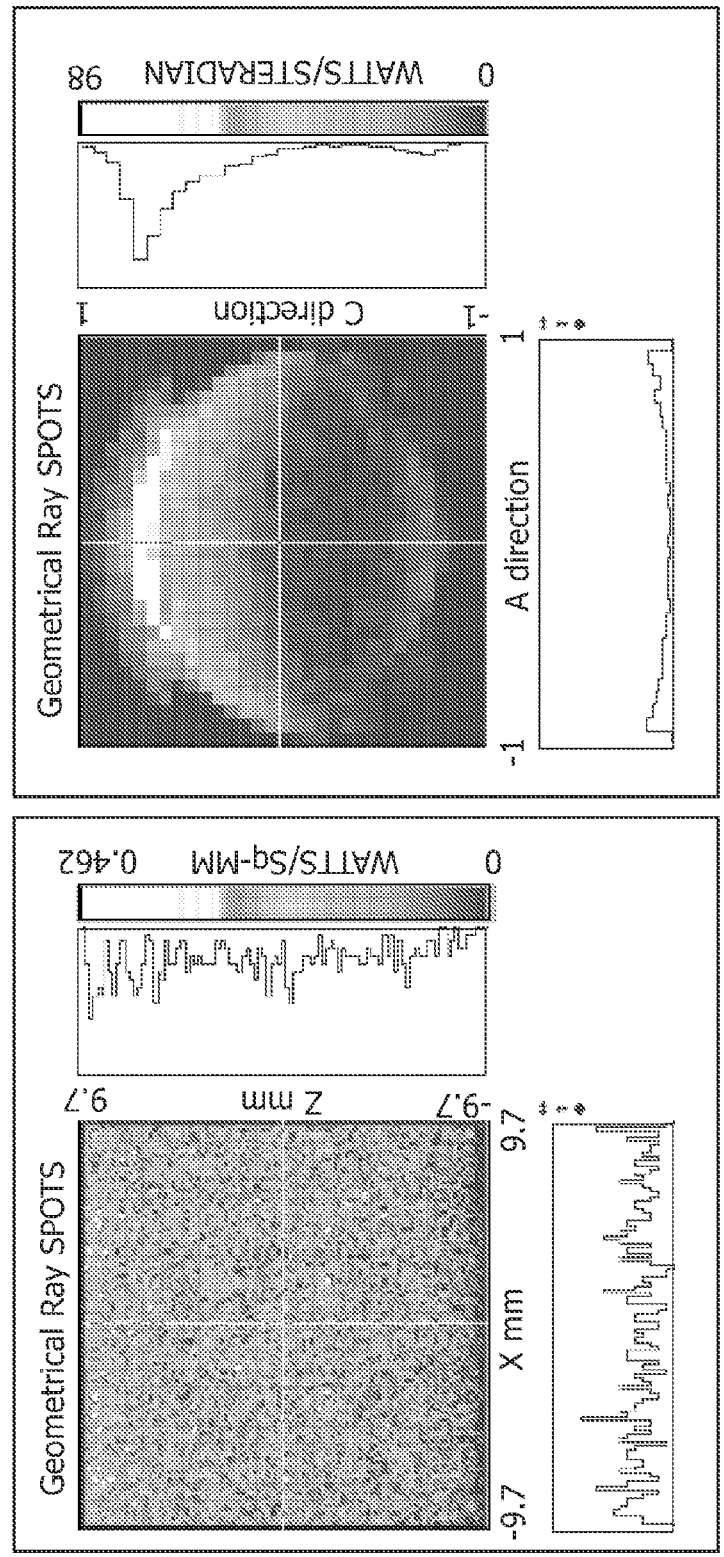

FIGS. 5a-b show results from one of the examples below.
FIGS. 6a-b show results from one of the examples below.
FIGS. 7a-b show results from one of the examples below.

Figure 1:
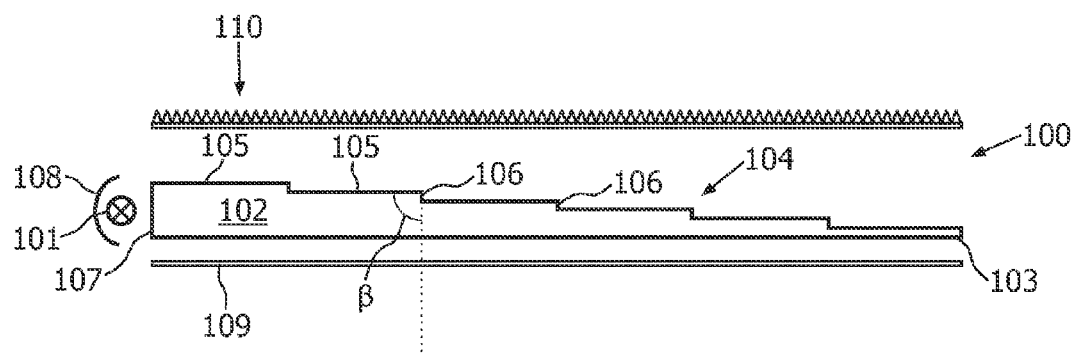
FIG. 1 illustrates, in cross sectional view, an embodiment of a backlight arrangement of the present invention.

A first exemplary backlight arrangement 100 of the present invention is illustrated in FIG. 1, comprising at least a light source 101, a waveguide plate 102 having a back surface 103, a front surface 104 and a surface 107 for receiving light. The front surface 104 comprises a plurality of planar parallel portions 105 and a plurality of facets 106 connecting the planar parallel portions 105.

The thickness of the waveguide plate 102 decreases, stepwise for each facet, with the distance from the surface 107 for receiving light.

In this embodiment, the faceted front surface is intended to face a display panel, such as for example a liquid crystal cell, whereas the flat back surface 104 is intended to face in the opposite direction. However, as will be realized by those skilled in the art and from the following description, the inverse orientation is also possible and is encompassed by the scope of this invention, i.e. that the flat surface 103 forms the surface which is intended to face the display panel and the faceted surface 104 forms the surface opposite thereto.

The light source emits light onto the surface 107 for receiving light, and at least part of this light is introduced into the waveguide. As an introduced light beam travels in the waveguide 102, it will, once it encounters the back surface 103 or the parallel portions 105 of the front surface 104 at an angle of incidence exceeding the critical angle for total internal reflection, be reflected thereon and redirected towards the opposite surface. The angular range within which light is conducted in this manner is hereinafter also denoted as the "waveguided angular range".

As used herein, "Total internal reflection", herein also abbreviated "TIR", refers to the phenomenon where a light beam is totally reflected in the interface between two media, e.g. that no light passes the interface. The passage of a light beam through a surface is bound to Snell's law:

$$n_1 \sin(\theta_1) = n_2 \sin(\theta_2).$$

In this formula $n_1$ is the refractive index in the first media (waveguide) and $\theta_1$ is the angle of incidence on the interface in the first media, and $n_2$ is the refractive index in the second media (surroundings) and $\theta_2$ is the angle of incidence on the interface in the second media. If $n_1 > n_2$, there does not exist any solution to Snell's law in case $\theta_1$ is large. Above a critical angle $\theta_C$ (where $\theta_C = \arcsin(n_2/n_1)$), this means that a light beam encountering the interface from the first medium, is fully reflected, without any light passing the surface.

When light in this waveguided angular range encounters a facet 106, light that has an angle of incidence on this facet surface smaller than the critical angle for total internal reflection will be extracted out from the waveguide via this facet.

In order to obtain an efficient extraction through the facet surfaces, the facets 106 should be formed at an angle close to perpendicular to the planar parallel portions 105. The angle between the planar parallel portions should thus preferably be in the range of from about 70° to 110°, such as from about 80° to about 100°, for example about 90°±5°.

Thus, the angular range of the light that is extracted through the facets 106 depends on the angular range of the light that is introduced via the surface for receiving light 107.

In a special case where the angle of the facets is 90° and the surface for receiving light is parallel to the facets, the angular range of the extracted light is essentially identical to the angular range of the light provided by the light source 101, which light is introduced into the waveguide via the surface for receiving light 107 and is within the waveguided angular range. As is known to those skilled in the art, the real world extraction of light through a surface is not theoretically perfect, and some irregularities, such as Fresnel reflections and the like, are always prone to appear. However, for the purposes of understanding the present invention, such irregularities may be neglected.

Thus, by varying the angular range of the light emitted by the light source, the angular range of the light extracted via the facets 106 varies accordingly.

As will be realized by those skilled in the art, in a direction perpendicular to the planar parallel portions 105 of a waveguide 102 according to this embodiment, essentially no light will be extracted.

The pitch of the facets 106, i.e. the distance between the facets, the height of the facets 106, the thickness of the waveguide plate 102 all depends on the application.

For example, the pitch of the facets may for example be from about 0.1 mm to 10 mm, and the and the height of the facets may for example be from 0.01 mm to 1 mm for a waveguide of the length 150 mm.

The thickness of the waveguide is typically much smaller than the length of the waveguide. For example the thickness may be less than 10% of the length.

However, the present invention is not limited to these values, and both larger and smaller dimensions may be suitable depending on the application, such as for example the size of the display device, etc.

The type of light sources suitable for use with the present invention depends on the application of the backlight arrangement. In general, any light source may be used, including light emitting diodes of any type known to those skilled in the art, incandescent light bulbs and fluorescent tubes. The type of light source used is not essential for the present invention.

The waveguide plate 102 is typically made of an optically clear material, such as a transparent glass or ceramic material or a transparent polymeric material, such as such as for example polymethylmethacrylates (PMMA), polycarbonates (PC) or polystyrenes (PS).

Typically, the material of the waveguide has a refractive index higher than the surrounding atmosphere such that light in the waveguide plate may be subject to total internal reflection.

As the waveguided light in the wave-guide plate 102 has an angular range, which includes directions towards the front surface 104, and towards the back surface 103, the angular range of the light extracted via the light also has such an angular range. Light that is extracted through the facet at a direction towards the backside will thus not be used, for example, for illuminating a display panel arranged on the front side of the backlight arrangement.

Thus, it may be advantageous to arrange a reflecting surface 109 at the backside of the backlight arrangement 100 in order to reflect light extracted towards this reflecting surface towards the front of the backlight arrangement. By using such a reflecting surface, the light utilization may be drastically enhanced.

For some applications, the mean direction of the angular range of the light extracted from the waveguide plate 102 through the facets 106 may not be the direction, which is desired for that application. For example, the extracted light may have a general direction too close to the plane of the planar parallel portions 105.

Thus, in embodiments of the present invention, a refractive element 110 is arranged on the front side of the waveguide plate 102. Such a refractive element should be capable of receiving the light extracted from the waveguide plate and changing the mean direction of that light into the desired mean direction.

Examples of such a refractive element suitable for use with the present invention are the redirection foils and brightness enhancement foils (BEF) produced by 3M. However, other such refractive elements, or redirection foils are known to those skilled in the art.

A backlight arrangement 100 of this first embodiment is suitable as a backlight for a display device, which should only display information within a certain direction, which is not in the direction near the perpendicular to the display panel.

For example, such a backlight arrangement 100 is suitable for use as a backlight in a transmissive or transflective liquid crystal display, as well known in the art.

Figure 2:
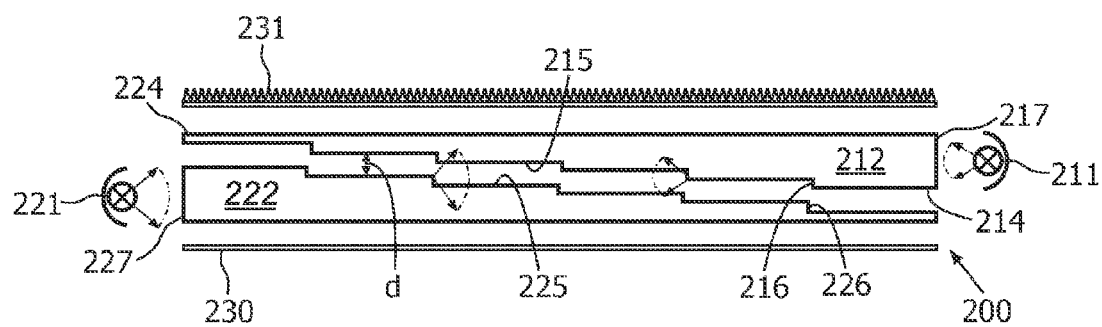
FIG. 2 illustrates, in cross sectional view, another embodiment of a backlight arrangement of the present invention.

A second exemplary embodiment of a backlight arrangement 200 is illustrated in FIG. 2, comprising a first waveguide plate 212 arranged to face the display panel and a second waveguide plate 222 arranged to face in the opposite direction, both waveguide plates being as described above, and being arranged on top of each other.

The same considerations as for the waveguide plate 102 are also applicable for the waveguide plates 212 and 222, respectively.

The surface 217 for receiving light of the first waveguide plate 212 and the surface 227 for receiving light of the second waveguide plate 222 are arranged parallel to each other.

However, the surface 217 and the surface 222 are arranged on opposite sides of the backlight arrangement, leading to that light extracted from the two waveguide plates are extracted in the opposite general direction. The light from the first waveguide plate 212 is extracted generally to the left, whereas the light from the second waveguide plate 222 is extracted generally to the right.

As illustrated in FIG. 2, the faceted surface 214 of the first waveguide plate 212 faces the faceted surface 224 of the second waveguide plate 222. However, as will be realized by those skilled in the art, the invention is not limited to this arrangement, and thus, the flat surface of the first waveguide may alternatively face the flat or the faceted surface of the second waveguide. The arrangement illustrated in FIG. 2, however, presents the most space efficient arrangement possible.

In such an embodiment where the facet surfaces of two waveguide plates faces each other and the receiving surfaces faces in opposite directions, it is preferred that there are a distance between the two faceted surfaces. As used herein, the distance between two faceted surfaces is to be taken as the vertical distance, i.e. the distance along the normal of the planar parallel portions of the faceted surfaces, from a planar parallel portion 215 of the first waveguide plate 212 to a superimposed planar parallel portion 225 of the second waveguide plate 222. In FIG. 2, this distance is indicated by "d".

It is also in such an embodiment preferred that the facets 216 of the first waveguide plate 212 are arranged directly above the facets 226 of the second waveguide plate 222.

A backlight arrangement of this second embodiment of the present invention is thus capable of providing light in two separate directions, for example two directions being non-perpendicular to the plane of the backlight.

The light extracted provided from the backlight arrangement in each of the two generally opposite directions depends, as discussed above, on the light provided by the respective light source.

Thus, it is in such a backlight possible to independently have a first angular range of the light in a first direction and a second angular range in a second direction.

In addition it is, in such a backlight, possible to independently have a first color or color temperature etc, in a first direction and a second color or color temperature etc, in a second direction.

A reflective surface 230 may be arranged at the backside of a backlight arrangement 200. For such a reflective surface 230, the same considerations for the reflective surface 109 in the first embodiment described above are applicable.

A refractive element 231, such as a redirection foil may be arranged at the front side of a backlight arrangement 200. For such a refractive element 231, the same considerations as for the refractive element 110 in the first embodiment described above are applicable.

Due to the capability to produce light in two discrete general directions, a backlight arrangement 200 of the present invention is well suited for use as a backlight in a dual view display device, such as a dual view liquid crystal display device.

Figure 3:
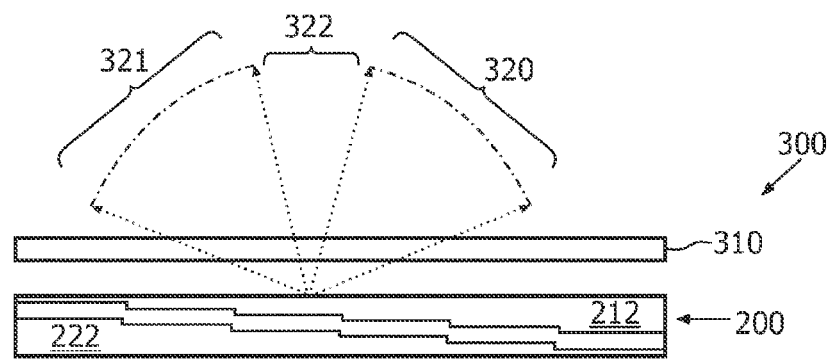
FIG. 3 illustrates, in cross sectional view, a display device of the present invention.

Such a display device 300 is schematically illustrated in FIG. 3, comprising a backlight arrangement 200 as previously described arranged to transilluminate a liquid crystal cell 310.

The backlight arrangement 200 provides light in two separate general directions, each with an independently chosen angular range. This light transilluminates the liquid crystal cell 310, producing an image that may be viewed from within the viewing angular ranges 320 and 321, respectively, but not from within the viewing angular range 322, as no light is emitted in that direction.

There exist several alternatives for dual view display where a backlight arrangement of the present invention is suitable.

A first exemplary embodiment of a dual view display is a time sequential LCD display, where for example the LC-cell alternately displays the information to be visible from a first direction, and alternately displays the information to be visible from a second direction.

The backlight is timed to the LC-cell such that when the LC-cell displays information to be visible from the first direction, the backlight emits light only in that first direction, and when the LC-cell displays information to be visible from the second direction, the backlight emits light only in that second direction.

For a typical display having a refreshment rate of in the range of from about 25 to about 200 Hz, typically 50 to 100 Hz, one approach is that every other image frame will be visible from the first direction, and every other image frame will be visible from the second direction.

A second exemplary embodiment of a dual view display is a display where the display panel is divided into a first and a second sub-section. The backlight arrangement in this approach may comprise a first controllable shutter covering the first display sub-section and a second controllable shutter, covering the second display sub-section. In operation, the backlight arrangement is arranged to emit, in a first mode, light in the first direction while making the first shutter transmissive and the second shutter blocking, and, in a second mode, light with the second direction while making the first shutter blocking and the second shutter transmissive.

As will be realized by those skilled in the art, a back light arrangement will be suitable for many types of dual view displays, including, but not limited to the above mentioned types.

Figure 4:
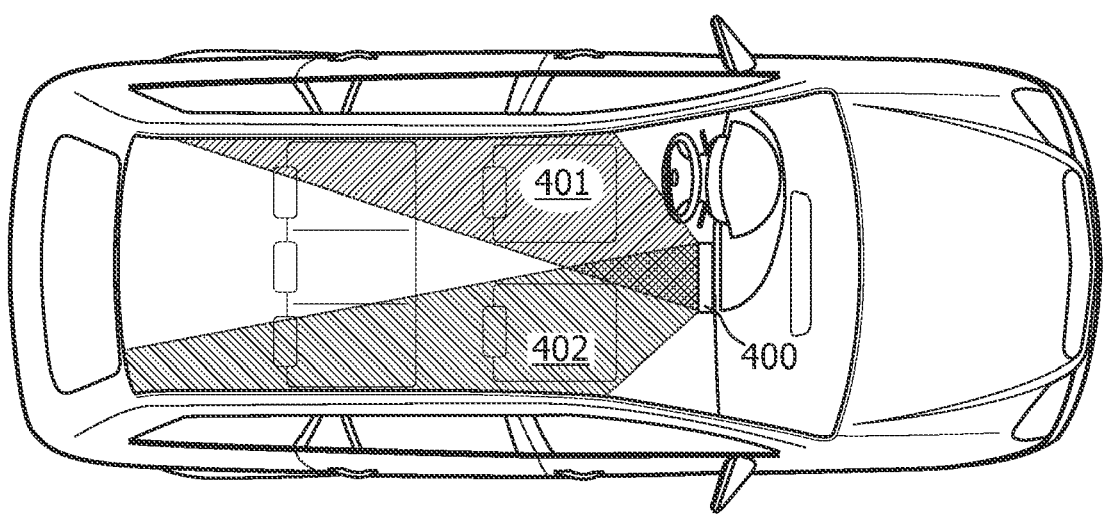
FIG. 4 illustrates an automotive application of a display device of the present invention.

An automotive application of the above dual view display devices are illustrated in FIG. 4, where the first direction from which the display device 400 may be viewed is represented by the driving seat 401, and the second direction is represented by the co-driver seat 402.

The person skilled in the art realizes that the present invention by no means is limited to the preferred embodiments described above. On the contrary, many modifications and variations are possible within the scope of the appended claims.

Thus to summarize, the present invention provides a backlight arrangement comprising at least a light source and a waveguide plate comprising a front surface and an opposing back surface and at least one surface for receiving light from said light source, said surface for receiving light connecting said front and back surfaces is provided. At least one of said front surface and back surface is a facetted surface comprising a plurality of planar parallel portions and a plurality of facets connecting said planar parallel portions. The facets are formed such that the thickness of said waveguide plate decreases stepwise with the distance from said surface for receiving light, and such that at least part of the light received into the waveguide plate via said surface for receiving light is extracted from said waveguide plate through said facets.

EXAMPLES

The invention will now be further described with reference to the following non-limiting examples, illustrating the function of a backlight arrangement of the present invention.

The results in these following examples were obtained by computer simulation (ray-tracing).

For these calculations, the software package ASAP of BREAULT Research was used on a compatible computer system.

In these examples, the dimensions and the number of facets were kept quite low in order to have a relatively high speed of simulation. As will be realized by those skilled in the art, the results will also hold for waveguide plates with larger dimensions and/or higher number of facets.

Graphical results of angular distribution comprises:

(i) intensity plot showing intensity vs. angle. The angles are given in terms of $\pi$ radians (from −1 to +1), and the intensity is plotted as a projection of the normalized ray direction vector to the plane. Thus, the intensity of rays normal to the plane is plotted at the center of the figure, and the intensity of rays parallel to the plane is always on a circle with radius one.

(ii) diagrams showing the intensity through the center of the intensity plot in C-direction (along the length of the waveguide) and A-direction (along the width of the waveguide) respectively.

Graphical results of the spatial distribution comprises:

(iii) intensity plot showing intensity vs. distance from surface for receiving light. Distances are given in terms of mm from the center of the waveguide. Light is introduced into the waveguide at z=−10 mm.

(iv) diagrams showing the intensity through the center of the intensity plot in z-direction (along the length of the waveguide) and x-direction (along the width of the waveguide) respectively.

Example 1

Single Waveguide Plate

A waveguide plate as illustrated in FIG. 1 having the following properties, surrounded by air, was simulated in the computer simulations:

| | |
|---|---|
| Length (z) | 20 mm |
| Width (x) | 20 mm |
| Thickness (maximum) | 0.8 mm |
| Facet height | 0.018 mm |
| Facet pitch | 0.45 mm |
| Refractive index | 1.49 |
| Angle β of facets | 90° |

A 100% reflecting surface was simulated on the back side of the backlight arrangement.

Light having an angular spread of Lambertian emitter, 90 degrees was introduced into the waveguide via the surface for receiving light.

The spatial distribution of the extracted light from this waveguide is shown in FIG. 5*a* and the angular distribution in FIG. 5*b*.

It is clearly visible from the results that this waveguide extracts light very homogenously over the entire surface.

Further, it is clearly visible from the results that this waveguide extracts light in a well-defined angular range, which does not include the direction along the normal of the waveguide front surface.

Example 2

Double Waveguide Plate

Two waveguide plates of the type used in example 1 was arranged in a conformation according to FIG. 2, with a reflecting surface arranged at the back side of the wave guide plate. The faceted surfaces of the plates were arranged at a distance of 0.018 mm from each other (i.e. the surfaces were displaced exactly one facet pitch).

For illustration, only the lower waveguide was provided with light via the surface for receiving light.

The spatial distribution of the extracted light from this waveguide is shown in FIG. 6*a* and the angular distribution in FIG. 6*b*.

It is clearly visible from the results that this waveguide extracts light very homogenously over the entire surface.

Further, it is clearly visible from the results that this waveguide extracts light in a well defined angular range, which essentially does not include the direction along the normal of the waveguide front surface.

Example 3

Double Waveguide Plate with Redirection Foil

The same waveguide plate as used in example 1 was used, with the addition of a BEF-foil arranged at the front of the waveguide plate.

This foil was provided with grooves parallel to the facets of the waveguide having a depth of 0.05 mm and a pitch of 0.2 mm The spatial distribution of the extracted light from this waveguide is shown in FIG. 7*a* and the angular distribution in FIG. 7*b*.

It is clearly visible from the results that this waveguide extracts light very homogenously over the entire surface.

Further, it is clearly visible from the results that this waveguide extracts light in a well defined angular range, which is clearly different to that in example 2 (closer to the normal). Still however, essentially no light is extracted in direction along the normal of the waveguide front surface.

The invention claimed is:

1. A backlight arrangement comprising at least a first and a second light source providing light having a first and a second angular spread to a first and a second waveguide plate respectively, each of the first and the second waveguide plate comprising a front surface and an opposing back surface and at least one surface for receiving light from said corresponding first and second light source, said at least one surface connecting said front and back surfaces, wherein at least one of said front surface and back surface is a facetted surface comprising a plurality of planar parallel portions and a plurality of facets connecting said planar parallel portions, the plurality of facets being formed such that the thickness of said waveguide plate decreases stepwise with the distance from said surface for receiving light, and such that at least part of the light received into each of the first and the second waveguide plate via said surface for receiving light is extracted from each of the first and the second waveguide plate through said plurality of facets.

2. The backlight arrangement according to claim 1, wherein said facets are formed at angles β in the range of from 70° to 110° to the surfaces of said planar parallel portions.

3. The backlight arrangement according to claim 1, wherein each out of said facets is formed perpendicularly to the surfaces of said planar parallel portions.

4. The backlight arrangement according to claim 1, wherein the first and second waveguide plate are arranged on top of each other.

5. The backlight arrangement according to claim 4, wherein the surface for receiving light of said first waveguide plate and said surface for receiving light of said second waveguide plate are arranged parallel to each other and facing opposite directions.

6. The backlight arrangement according to claim 4, wherein the faceted surface of said first waveguide faces the faceted surface of said second waveguide.

7. The backlight arrangement according to claim 6, wherein the faceted surface of said first waveguide is separated from the faceted surface of said second waveguide by a distance (d) corresponding to at least the height of the facets of said waveguides.

8. The backlight arrangement according to claim 1, having a front side adapted to face a display panel and an opposing back side, wherein a reflective surface is arranged at said back side of said backlight arrangement.

9. The backlight arrangement according to claim 1, having a front side adapted to face a display panel and an opposing back side, wherein a refractive element is arranged at said front side of said backlight arrangement.

10. A display device comprising a backlight arrangement that includes at least a first and a second light source providing light having a first and a second angular spread to a first and a second waveguide plate respectively, each of the first and the second waveguide plate including a front surface and an opposing back surface and at least one surface for receiving light from said corresponding first and second light source, said at least one surface connecting said front and back surfaces, wherein at least one of said front surface and back surface is a facetted surface comprising a plurality of planar parallel portions and a plurality of facets connecting said planar parallel portions, the plurality of facets being formed such that the thickness of said waveguide plate decreases stepwise with the distance from said surface for receiving light and such that at least part of the light received into each of the first and the second waveguide plate via said surface for receiving light is extracted from each of the first and the second waveguide plate through said plurality of facets.

11. The display device according to claim 10, being a dual view display device.

\* \* \* \* \*